United States Patent
Verstraeten

(10) Patent No.: US 11,577,555 B2
(45) Date of Patent: Feb. 14, 2023

(54) ELECTRICALLY CONDUCTIVE YARN

(71) Applicant: NV Bekaert SA, Zwevegem (BE)

(72) Inventor: Steve Verstraeten, Antwerp (BE)

(73) Assignee: NV BEKAERT SA, Zwevegem (BE)

( * ) Notice: Subject to any disclaimer, the term of this patent is extended or adjusted under 35 U.S.C. 154(b) by 1093 days.

(21) Appl. No.: 16/310,915

(22) PCT Filed: Jul. 4, 2017

(86) PCT No.: PCT/EP2017/066537
§ 371 (c)(1),
(2) Date: Dec. 18, 2018

(87) PCT Pub. No.: WO2018/011001
PCT Pub. Date: Jan. 18, 2018

(65) Prior Publication Data
US 2019/0344629 A1    Nov. 14, 2019

(30) Foreign Application Priority Data

Jul. 15, 2016   (EP) .................................. 16179616

(51) Int. Cl.
*B60C 19/08* (2006.01)
*D02G 3/12* (2006.01)
(Continued)

(52) U.S. Cl.
CPC ............ *B60C 19/084* (2013.01); *B60C 19/08* (2013.01); *B60C 19/082* (2013.01); *D02G 3/04* (2013.01); *D02G 3/12* (2013.01); *D02G 3/28* (2013.01); *D02G 3/36* (2013.01); *D02G 3/38* (2013.01); *D02G 3/441* (2013.01); *D02G 3/48* (2013.01); *B60C 2011/0016* (2013.01);
(Continued)

(58) Field of Classification Search
CPC .. D02G 3/12; D02G 3/28; D02G 3/38; D02G 3/441; B60C 19/08; B60C 19/082; B60C 19/084
See application file for complete search history.

(56) References Cited

U.S. PATENT DOCUMENTS

| | | |
|---|---|---|
| 2,050,298 A | 8/1936 | Everett |
| 3,277,564 A | 10/1966 | Webber et al. |

(Continued)

FOREIGN PATENT DOCUMENTS

| | | |
|---|---|---|
| EP | 1 621 365 | 2/2006 |
| JP | 2016-078742 | 5/2016 |

OTHER PUBLICATIONS

International Search Report dated Sep. 22, 2017 in International Application No. PCT/EP2017/066537.

*Primary Examiner* — Shaun R Hurley
(74) *Attorney, Agent, or Firm* — Wenderoth, Lind & Ponack, L.L.P.

(57) ABSTRACT

An electrically conductive yarn (200, 300) comprising a first yarn (262, 362) and a second yarn (264, 364), the first yarn (262, 362) comprises or consists out of a plurality of stainless steel fibers, the second yarn (264, 364) comprises organic fibers wherein the first yarn (362) and the second yarn (364) are twisted or cabled together or the second yarn (264) is wrapped around the first yarn (262) such that the first yarn (262) is provided as a core yarn and such that the first yarn (262) provides part of the surface of the electrically conductive yarn (200).

14 Claims, 2 Drawing Sheets

(51) Int. Cl.
*D02G 3/44* (2006.01)
*D02G 3/28* (2006.01)
*D02G 3/38* (2006.01)
*D02G 3/04* (2006.01)
*D02G 3/36* (2006.01)
*D02G 3/48* (2006.01)
*B60C 11/00* (2006.01)

(52) U.S. Cl.
CPC ...... *D10B 2101/20* (2013.01); *D10B 2201/02* (2013.01); *D10B 2331/02* (2013.01); *D10B 2331/021* (2013.01); *D10B 2331/04* (2013.01); *D10B 2401/16* (2013.01); *D10B 2505/12* (2013.01)

(56) References Cited

U.S. PATENT DOCUMENTS

| | | | | |
|---|---|---|---|---|
| 3,394,213 | A | | 7/1968 | Roberts et al. |
| 3,882,667 | A | * | 5/1975 | Barry .................. D02G 3/441 57/244 |
| 3,938,313 | A | | 2/1976 | Marzocchi |
| 4,793,130 | A | * | 12/1988 | Togashi .................. D02G 3/12 57/210 |
| 5,881,547 | A | * | 3/1999 | Chiou .................. D02G 3/12 57/212 |
| 5,927,060 | A | * | 7/1999 | Watson .................. D02G 3/12 57/212 |
| 6,957,525 | B2 | * | 10/2005 | Verstraeten ............ D02G 3/12 57/238 |
| 7,291,391 | B2 | * | 11/2007 | Watson .................. D02G 3/12 57/244 |
| 10,829,870 | B2 | * | 11/2020 | Carlsson ............... D02G 3/441 |
| 2003/0209003 | A1 | * | 11/2003 | Verstraeten ............ D02G 3/12 57/212 |
| 2004/0065072 | A1 | * | 4/2004 | Zhu ...................... D02G 3/28 57/314 |
| 2005/0028512 | A1 | * | 2/2005 | Boni .................... D02G 3/12 57/212 |
| 2005/0087275 | A1 | | 4/2005 | Zanzig et al. |
| 2005/0282009 | A1 | * | 12/2005 | Nusko .................. D02G 3/328 264/103 |
| 2011/0126335 | A1 | | 6/2011 | Schultz |
| 2012/0298280 | A1 | * | 11/2012 | Domingo ............... B60C 9/0007 152/556 |

* cited by examiner

ELECTRICALLY CONDUCTIVE YARN

TECHNICAL FIELD

The invention relates to the field of electrically conductive yarns and to pneumatic rubber tires comprising such yarns to create an electrically conductive path through the tire.

BACKGROUND ART

In order to dissipate static electricity, electrical conductivity is required between the bead and the tread of pneumatic rubber tires. This electrical conductivity needs attention as the carcass reinforcement is formed by high tenacity polymer fibers such as high tenacity polyester fibers; and because of the tendency to replace carbon black by other additives in the rubber compounds of the carcass of tires.

US2005/0087275A1 discloses a pneumatic rubber tire which contains at least one electrically conductive cord extending between its bead portion and its tread portion to provide a path of least electrical resistance. The electrically conductive cord comprises at least one electrically conductive metal filament spirally wound around a centrally disposed core of at least one organic fiber. The electrically conductive cord extends from a rubber component in a bead portion of the tire which is relatively electrically conductive to a rubber component in the tread portion of the tire which is relatively electrically conductive in a manner that said electrically conductive cord does not extend to, and therefore is exclusive of, an outer surface of the tire. An electrically conductive path is thereby provided between a mounting surface of the tire in its bead region to a running surface of the tire tread. The electrically conductive cord may comprise an electrically conductive metal filament, electrically conductive carbon fiber, or their combination, spirally wound around a core of at least one organic fiber. The organic fiber core of the cord may comprise at least one filament of various organic fibers, particularly synthetic fibers, such as aramid, nylon, rayon, polyester, ultra-high molecular weight polyethylene (UHMWPE) or cotton or blends of such fibers. The electrically conductive metal filament spirally wound around the core may be of various metals, and alloys thereof, such as for example, steel (an iron alloy and including stainless steel), copper and brass.

JP2016078742A describes a pneumatic tire having improved durability of a conductive cord. The pneumatic tire includes two beads, at least one carcass layer, a belt layer, a tread rubber layer, and a pair of side wall rubber layers. The pneumatic tire includes a conductive cord continuously extending at least from a bead part to the belt layer.

EP1621365A1 discloses a pneumatic rubber tire which contains at least one electrically conductive cord extending from an external outer surface of its wheel-rim mounting surface rubber component to an internal electrically conductive tread base layer rubber component to provide an electrically conductive path, between the outer tire wheel-rim mounting surface and the internal tire tread base layer. The electrically conductive cord comprises at least one electrically conductive metal filament spirally wound around a centrally disposed core of at least one organic fiber.

DISCLOSURE OF INVENTION

The first aspect of the invention is an electrically conductive yarn comprising a first yarn and a second yarn. The first yarn comprises—and preferably consists out of—a plurality of stainless steel fibers. The second yarn comprises—and preferably consists out of—organic fibers. In the first embodiment of the invention, the first yarn and the second yarn are twisted or cabled together. In the second embodiment of the invention, the second yarn is wrapped around the first yarn such that the first yarn is provided as a core yarn; and such that the first yarn provides part of the surface of the electrically conductive yarn.

It is a benefit of the electrically conductive yarn of the invention that—when used in a pneumatic rubber tire to obtain an electrically conductive path between the bead and the tread of the tire—excellent electrical conductive is obtained, combined with excellent flex fatigue resistance of the electrically conductive yarn and with sufficient adhesion of the electrically conductive yarn to the rubber of the tire. The combined, synergistic result is excellent lifetime of the electrically conductive yarn for its function as electrically conductive path between bead and tread of the tire. The electrically conductive yarn can further provide a function as gas bleeder cord in the tire. The excellent flex fatigue resistance is provided by the use of conductive fibers, which have a smaller diameter than when one or more wires are used. As the first yarn—which provides the electrical conductivity—provides part of the surface of the electrically conductive yarn good electrical conductivity is provided between rubber components in the bead portion and in the tread portion on the one hand; and the electrically conductive yarn on the other hand when the electrically conductive yarn is used in a pneumatic rubber tire; or between steel cords in the tire and the electrically conductive yarn when in contact with each other in the tire. The use of a plurality of stainless steel fibers synergistically contributes to the excellent functional life time, as breakage of a minor amount of stainless steel fibers does not have a considerable effect on the conductivity of the electrically conductive yarn.

Preferably, the stainless steel fibers are made out of an austenitic stainless steel alloy. Preferred stainless steel alloys comprise more than 16 percent by weight of chromium, and preferably less than 28 percent by weight of chromium. Preferred alloys are alloys out of the 300 series of ASTM A313. A particularly preferred alloy is alloy 316L (according to ASTM A313).

In preferred embodiments of the invention, the organic fibers are cotton fibers or rayon fibers or thermoplastic polymer fibers such as polyester fibers, polyamide fibers or aramid fibers, e.g. para-aramid fibers. It is also possible to use blends of such fibers.

In preferred embodiments of the invention, the second yarn is a cotton fiber yarn. The use of cotton yarns is preferred as it provides adhesion to rubber to the electrically conductive yarn.

Preferably, the plurality of stainless steel fibers is twisted and/or cabled together to form the first yarn.

Preferably, the cross section of the first yarn comprises at least 40 stainless steel fibers, more preferably at least 100 stainless steel fibers, even more preferably at least 150 stainless steel fibers, even more preferably at least 250 stainless steel fibers.

Preferably, the stainless steel fibers have an equivalent diameter less than 30 µm, more preferably less than 25 µm; even more preferably less than 22 µm, even more preferably less than 15 µm, even more preferably less than 13 µm, even more preferably less than 10 µm. And preferably more than 5 µm. With equivalent diameter of a fiber is meant the diameter of the circle having the same surface area as the area of the cross section of the fiber; cross section which is not necessarily circular. Such fine fibers provide excellent fatigue resistance to the electrically conductive yarn.

Preferably, the stainless steel fibers are made via bundled drawing. Bundled drawing is described e.g. in U.S. Pat. Nos. 2,050,298, 3,277,564 and in U.S. Pat. No. 3,394,213. Stainless steel fibers produced via bundled drawing have a typical polygonal cross section allowing identification that the fibers have been produced by bundled drawing.

In preferred embodiments, the stainless steel fibers are filaments. With filaments is meant fibers of virtually infinite length. Technology for the production of bundles of bundled drawn stainless steel filaments is described e.g. U.S. Pat. Nos. 2,050,298, 3,277,564 and in U.S. Pat. No. 3,394,213. More preferably, the first yarn comprises at least 40 filaments, more preferably at least 100 filaments, even more preferably at least 150 filaments—and even more preferably at least 250 filaments—in its cross section. Preferably, the equivalent diameter of stainless steel filaments for use in the invention is less than 30 µm; more preferably less than 25 µm; and preferably more than 5 µm. Preferred equivalent diameter of stainless steel filaments for use in the invention are e.g. 8 µm, 12 µm, 14 µm or 22 µm. First yarns wherein the stainless steel fibers are filaments have the benefit of having higher electrical conductivity than when stainless steel fibers of discrete length are used.

In preferred embodiments, the stainless steel fibers are fibers of discrete length. Preferably, the equivalent diameter of fibers of discrete length for use in the invention is less than 20 µm, more preferably less than 15 µm; e.g. 12 µm or 8 µm. In preferred embodiments, the stainless steel fibers of discrete length have been produced by bundled drawing, followed by cutting or stretch breaking of the bundle of fibers into fibers of discrete length. The stainless steel fibers of discrete length are then spun into yarns. In a preferred embodiment, the first yarn is a single yarn. In another preferred embodiment, the first yarn is a two ply yarn. Electrically conductive yarns comprising or consisting out of stainless steel fibers of discrete length have improved flex fatigue lifetime.

When the first yarn comprises or consists out of stainless steel fibers of discrete length, preferred counts are between 50 tex and 300 tex. More preferred counts are between 100 and 220 tex.

When the first yarn comprises or consists out of stainless steel fibers of discrete length, preferably the cross section of the first yarn comprises at least 50 stainless steel fibers, more preferably at least 75 stainless steel fibers, more preferably at least 100 stainless steel fibers, and even more preferably at least 150 stainless steel fibers.

In a preferred embodiment of the invention, the first yarn is a blended yarn comprising a plurality of stainless steel fibers and organic fibers. Examples of organic fibers that can be used are cotton fibers, or rayon fibers or thermoplastic polymer fibers such as polyester fibers, polyamide fibers or para-aramid fibers. Preferably, the blended yarn comprises an intimate fiber blend comprising a plurality of stainless steel fibers and organic fibers. A preferred blended yarn comprises at least 40% by weight stainless steel fibers. An example of a first yarn according to such embodiment is a 20 tex ring spun yarn from an intimate blend of cotton and stainless steel fibers, each 50% by weight. In embodiments wherein the first yarn is a blended yarn; the electrically conductive yarn can be a ply-twisted yarn wherein the first yarn is ply-twisted with a second yarn; preferably the second yarn has the same composition as the first yarn. An example of such conductive yarn is a 20*2 tex yarn wherein both plies are ring spun from an intimate blend of cotton fibers and stainless steel fibers, each 50% by weight.

In a preferred embodiment of the invention, one or two second yarns is or are wrapped around the first yarn such that the first yarn is provided as a core yarn; and such that the first yarn provides part of the surface of the electrically conductive yarn. It is a benefit of such embodiments that the electrically conductive first yarn is provided in a straight orientation in the electrically conductive yarn, contributing to the good electrical conductivity of the electrically conductive yarn. Preferably, if two second yarns are used, both second yarns have the same construction. Preferred second yarns for such embodiments are cotton fiber yarns.

In preferred embodiments wherein one or two second yarns is or are wrapped around the first yarn, the one or two second yarns is or are wrapped with less than 1000 turns per meter around the first yarn; and preferably with less than 700 turns per meter; and more preferably with less than 500 turns per meter.

In a preferred embodiment of the invention, two second yarns are wrapped around the first yarn. One second yarn is wrapped in Z-direction around the first yarn; and the other second cotton yarn is wrapped in S-direction around the first yarn. Preferably, both second yarns are wrapped with the same number of turns around the first yarn. It is a benefit of such embodiment that enhanced functionality is obtained, as the improved stability of the electrically conductive yarns thanks to the balanced construction allows more correct positioning of the yarn in the tire, leading to synergistic benefits in terms of function lifetime of the electrically conductive yarn in the tire. Preferably, if two second yarns are used, both second yarns have the same construction.

In preferred embodiments wherein one or two second yarns is or are wrapped around the first yarn, the first yarn provides at least 10%, more preferably at least 25%, more preferably at least 50% of the surface of the electrically conductive yarn. Preferred are embodiments wherein a higher percentage of the surface of the electrically conductive yarn is provided by the first yarn, because a better conductive path is provided when the conductive yarn is used in a tire; thanks to better conductive contact between conductive rubber compounds in the bead and in the thread of the tire with the conductive yarn and/or better conductive contact between the electrically conductive yarn and steel cords in the tire.

In a preferred embodiment wherein the first yarn and the second yarn are twisted or cabled together, the first yarn and the second yarn are twisted or cabled together with a twist of more than 20 turns per meter; preferably more than 100 turns per meter; and more preferably with a twist of less than 700 turns per meter, preferably of less than 600 turns per meter, more preferably of less than 300 turns per meter.

The second aspect of the invention is a pneumatic rubber tire for a motorized vehicle. The tire comprises a bead portion, a carcass portion, a tread portion and at least one electrically conductive yarn as in the first aspect of the invention. The bead portion comprises steel wire bead reinforcement and a rubber component comprising electrically conductive particles. The carcass portion comprises a rubber component and carcass reinforcement plies comprising high tenacity polymer fiber cords, e.g. polyester fiber or polyamide fiber high tenacity cords. The tread portion comprises a rubber component comprising electrically conductive particles. The entirety of the rubber of the tread portion can comprise electrically conductive particles; however, it is also possible that only a circumferential strip of the tread rubber component comprises electrically conductive particles such as carbon black. The at least one electrically conductive yarn is embedded in rubber. The at least one electrically conductive yarn extends from the bead portion of the tire, through the carcass portion, to the tread portion of the tire. The electrically conductive yarn is provided in the tire to provide a path of least electrical resistance, thereby providing an electrically conductive path between the mounting surface of the tire in its bead region to a running surface of the tire tread.

The electrically conductive particles in the bead rubber component and/or in the tread rubber component can be carbon black.

In a preferred pneumatic rubber tire according to the second aspect of the invention, the at least one electrically conductive yarn is positioned on the outer surface of a carcass reinforcement ply between the carcass reinforcement plies and the sidewall rubber layer.

In a preferred pneumatic rubber tire according to the second aspect of the invention, the at least one electrically conductive yarn is positioned on the inner surface of a carcass reinforcement ply between the carcass reinforcement plies and the tire rubber inner liner layer.

In a preferred pneumatic rubber tire according to the second aspect of the invention, the at least one electrically conductive yarn is positioned between two carcass reinforcement plies.

Another aspect is an electrically conductive yarn for creating an electrically conductive path through the carcass portion of a pneumatic rubber tier. The electrically conductive yarn comprises an intimate blend of stainless steel fibers of discrete length and organic fibers; the intimate blend comprises at least 40% by weight of stainless steel fibers, more preferably at least 50% by weight of stainless steel fibers. Preferred are austenitic stainless steel fibers. Examples of organic fibers that can be used are cotton fibers, or rayon fibers or thermoplastic polymer fibers such as polyester fibers, polyamide fibers or para-aramid fibers, or blends of such fibers. Preferably, the conductive yarn is a spun yarn. An example is a 40 tex ring spun yarn out of an intimate blend of 50% by weight stainless steel fibers (e.g. out of alloy 316L) of discrete length and 50% by weight of cotton fibers. Another example is a 20*2 tex (two ply yarn) conductive yarn, wherein each of the plies are ring spun yarns out of an intimate blend of 50% by weight stainless steel fibers of discrete length and 50% by weight of cotton fibers.

Also provided is a pneumatic rubber tire for a motorized vehicle. The tire comprises a bead portion, a carcass portion, a tread portion and at least one electrically conductive yarn as in any embodiment of this paragraph. The bead portion comprises steel wire bead reinforcement and a rubber component comprising electrically conductive particles. The carcass portion comprises a rubber component and carcass reinforcement plies comprising high tenacity polymer fiber cords. The tread portion comprises a rubber component comprising electrically conductive particles. The entirety of the rubber of the tread portion can comprise electrically conductive particles; however; it is also possible that only a circumferential strip of the tread rubber component comprises electrically conductive particles such as carbon black. The at least one electrically conductive yarn is embedded in rubber. The at least one electrically conductive yarn extends from the bead portion of the tire, through the carcass portion, to the tread portion of the tire. The electrically conductive yarn is provided in the tire to provide a path of least electrical resistance, thereby providing an electrically conductive path between the mounting surface of the tire in its bead region to a running surface of the tire tread. The at least one electrically conductive yarn can e.g. be positioned on the outer surface of a carcass reinforcement ply between the carcass reinforcement plies and the sidewall rubber layer, or on the inner surface of a carcass reinforcement ply between the carcass reinforcement plies and the tire rubber inner liner layer, or between two carcass reinforcement plies.

BRIEF DESCRIPTION OF FIGURES IN THE DRAWINGS

MODE(S) FOR CARRYING OUT THE INVENTION

Figure 1:
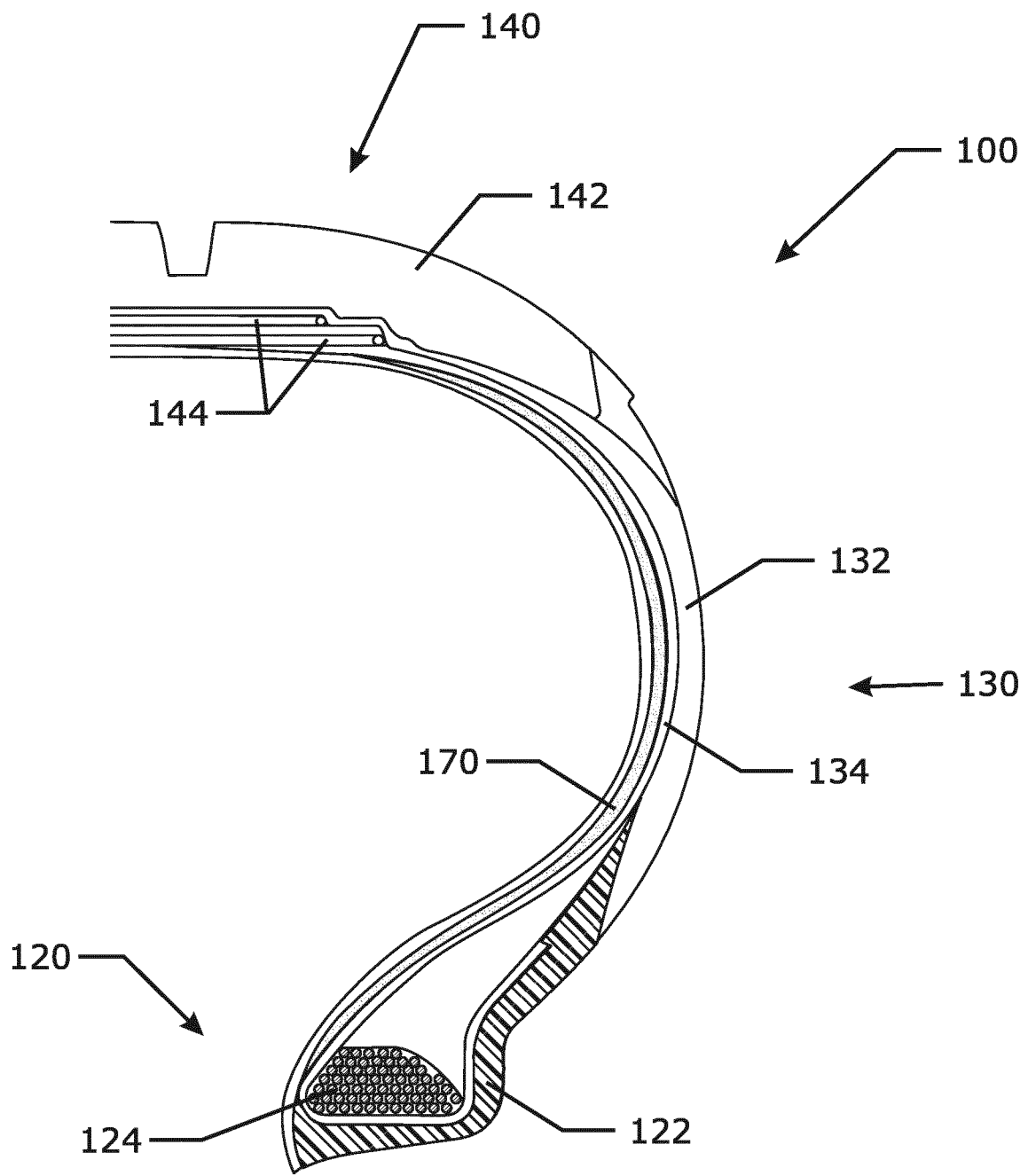
FIG. 1 shows a pneumatic rubber tire as in the second aspect of the invention.

FIG. 1 shows a cross section of a pneumatic rubber tire 100 as in the second aspect of the invention. The tire 100 comprises a bead portion 120, a carcass portion 130, a tread portion 140 and at least one electrically conductive yarn 170 as in the first aspect of the invention; e.g. as in the examples described in the following paragraphs. The bead portion 120 comprises steel wire bead reinforcement 124 and a rubber component 122 comprising electrically conductive particles. The carcass portion 130 comprises a rubber component 132 and carcass reinforcement plies 134 comprising high tenacity polymer fiber cords. The tread portion 140 comprises a rubber component 142 comprising electrically conductive particles and belt plies 144. The at least one electrically conductive yarn 170 is embedded in rubber; and extends from bead portion 120 of the tire, through the carcass portion 130, to the tread portion of the tire.

Figure 2:
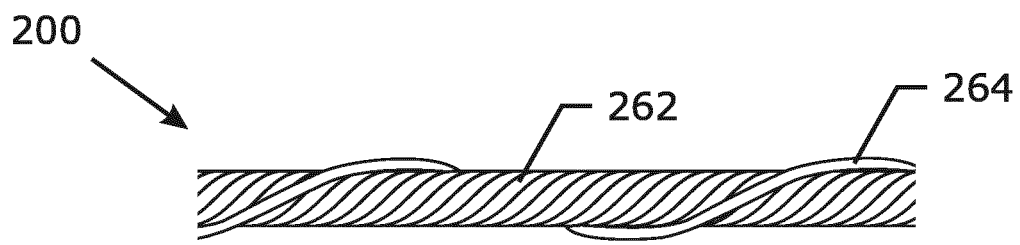
FIGS. 2, 3 and 5 show embodiments of electrically conductive yarns as in the first aspect of the invention.

FIG. 2 shows an example of an electrically conductive yarn 200 according to the first aspect of the invention. The electrically conductive yarn 200 comprises a first yarn 262 and one second yarn 264, e.g. a cotton yarn. The first yarn 262 consists out of a plurality of stainless steel fibers. The second yarn 264 is wrapped around the first yarn 262 such that the first yarn is provided as a core yarn; and such that the first yarn provides part of the surface of the electrically conductive yarn.

Figure 3:
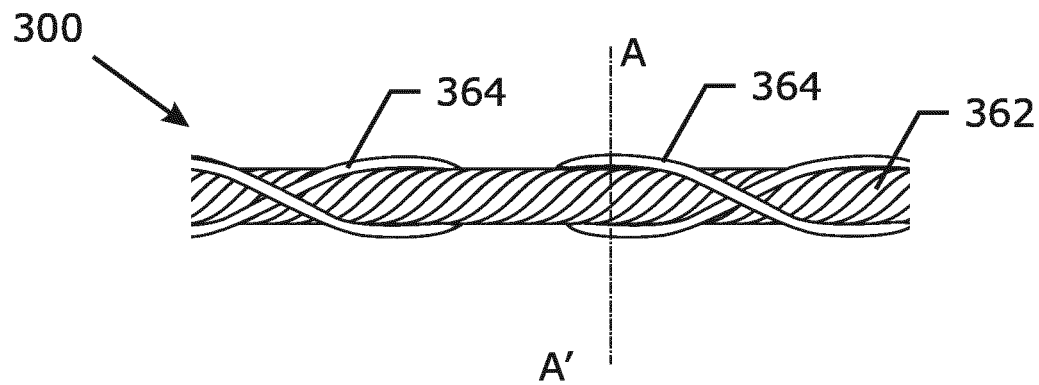
Figure 4:
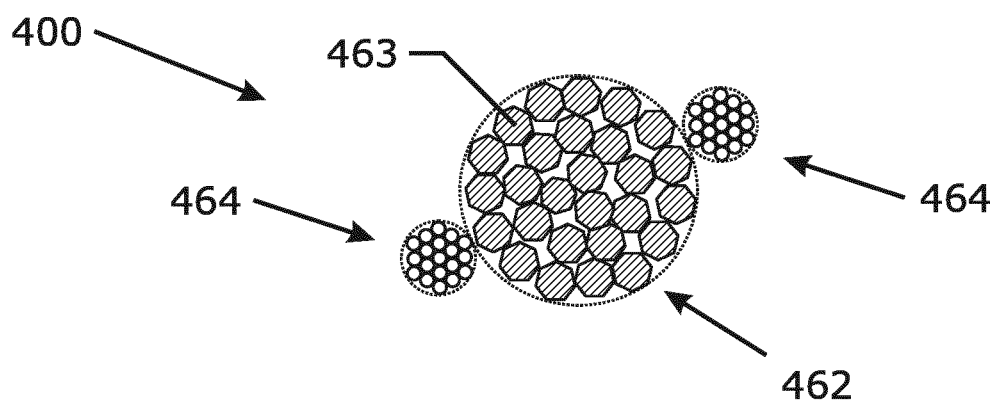
FIG. 4 shows a cross section of an electrically conductive yarn according to the first aspect of the invention.

FIG. 3 shows an example of an electrically conductive yarn 300 according to the first aspect of the invention. The electrically conductive yarn 300 comprises a first yarn 362 and two second yarns 364, e.g. cotton yarns. The first yarn 362 consists out of a plurality of stainless steel fibers. The second yarns 364 are wrapped around the first yarn 362 such that the first yarn is provided as a core yarn; and such that the first yarn provides part of the surface of the electrically conductive yarn. One second yarn is wrapped in S-direction and the other second yarn is wrapped in Z-direction around the first yarn. FIG. 4 shows a cross section 400 along A-A' of the electrically conductive yarn of FIG. 3, it shows the first yarn 462 consisting out of bundled drawn stainless steel fibers 463 having a polygonal cross section; and the two second yarns 464.

Figure 5:
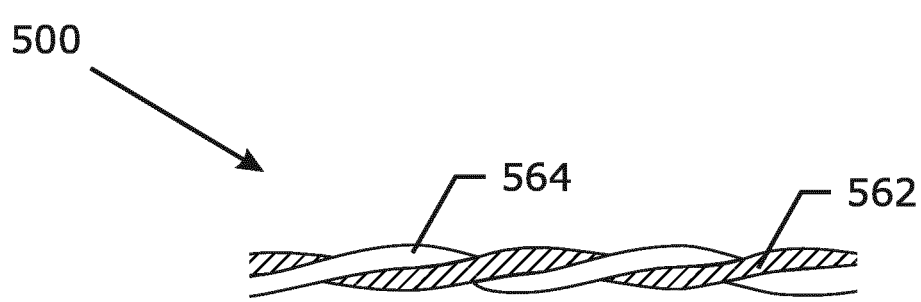

FIG. 5 shows an example of an electrically conductive yarn 500 according to the first aspect of the invention. The electrically conductive yarn 500 comprises a first yarn 562 and one second yarn 564, e.g. a cotton yarn. The first yarn 562 consists out of a plurality of stainless steel fibers. The first yarn 562 and the second yarn 564 are twisted together.

Alternatively, the first yarn and the second yarn can be cabled together. The twist with which the first yarn and the second yarn are twisted or cabled together is preferably between 10 and 600 turns per meter length of the electrically conductive yarn.

Besides cotton fiber yarns, other yarns can be used as second yarns; e.g. rayon fiber yarns, polyester fiber yarns, polyamide fiber yarns or para-aramid fiber yarns; or blended yarns comprising such fibers.

An example of a first yarn that can be used in the invention is a twisted stainless steel filament yarn comprising 275 bundled drawn stainless steel filaments of equivalent diameter 12 μm, twisted with 100 turns per meter in Z-direction.

Another example of a first yarn that can be used in the invention is a twisted stainless steel filament yarn comprising 550 bundled drawn stainless steel filaments of equivalent diameter 12 μm twisted together with 175 turns per meter in S-direction.

Another example of a first yarn that can be used in the invention is a cabled stainless steel filament yarn comprising 2 times 275 bundled drawn stainless steel filaments of equivalent diameter 12 μm cabled together with 175 turns per meter.

Another example of a first yarn that can be used in the invention is a twisted stainless steel filament yarn comprising 90 bundled drawn stainless steel filaments of equivalent diameter 14 μm twisted together with 100 turns per meter in Z-direction.

Another example of a first yarn that can be used in the invention is a ply-twisted 90*2 tex stainless steel fiber yarn consisting out of stainless steel fibers of discrete length. The yarn is spun out of stretch broken bundled drawn stainless steel fibers of 12 μm equivalent diameter.

In an example of an electrically conductive yarn according to the invention, the first yarn is a twisted stainless steel filament yarn comprising 275 bundled drawn stainless steel filaments of equivalent diameter 12 μm twisted with 100 turns per meter in Z-direction. The first yarn has been wrapped in S-direction with 300 turns per meter by a cotton yarn of 33 tex. About 60% of the surface of the conductive yarn is provided by the first yarn.

In another example of an electrically conductive yarn according to the invention, the first yarn is a twisted stainless steel filament yarn comprising 275 bundled drawn stainless steel filaments of equivalent diameter 12 μm twisted with 100 turns per meter in Z-direction. The first yarn has been wrapped by two cotton yarns of 33 tex. The first cotton yarn is wrapped around the first yarn in S-direction with 300 turns per meter; and the second cotton yarn is wrapped around the first yarn in Z-direction with 300 turns per meter. More than 60% of the surface of the conductive yarn is provided by the first yarn.

In another example of an electrically conductive yarn according to the invention, the first yarn is a ply-twisted 90*2 tex stainless steel fiber yarn consisting out of stainless steel fibers of discrete length. The first yarn is spun from stretch broken bundled drawn stainless steel fibers of 8 μm equivalent diameter. The first yarn has been wrapped in S-direction with 300 turns per meter by a cotton yarn of 33 tex. More than 60% of the surface of the conductive yarn is provided by the first yarn.

In another example of an electrically conductive yarn according to the invention, the first yarn is a ply-twisted 90*2 tex stainless steel fiber yarn consisting out of stainless steel fibers of discrete length. The first yarn is spun from stretch broken bundled drawn stainless steel fibers of 8 μm equivalent diameter. The first yarn has been wrapped by two cotton yarns of 20 tex. The first cotton yarn is wrapped around the first yarn in S-direction with 600 turns per meter; and the second cotton yarn is wrapped around the first yarn in Z-direction with 600 turns per meter.

The invention claimed is:

1. A pneumatic rubber tire for a motorized vehicle, comprising
    a bead portion, wherein the bead portion comprises steel wire bead reinforcement and a rubber component comprising electrically conductive particles,
    a carcass portion comprising a rubber component and carcass reinforcement plies comprising high tenacity polymer fiber cords,
    a tread portion comprising a rubber component comprising electrically conductive particles, and
    at least one electrically conductive yarn,
  wherein the at least one electrically conductive yarn is embedded in rubber, and
  wherein the at least one electrically conductive yarn extends from the bead portion of the tire,
  through the carcass portion, to the tread portion of the tire,
    wherein the electrically conductive yarn comprises:
      a first yarn, wherein the first yarn comprises a plurality of stainless steel fibers, and
      a second yarn, wherein the second yarn comprises organic fibers,
    wherein either
    1) the first yarn and the second yarn are twisted or cabled together with a twist of more than 20 turns per meter, or
    2) the second yarn is wrapped around the first yarn such that the first yarn is provided as a core yarn and such that the first yarn provides part of the surface of the electrically conductive yarn.

2. The pneumatic rubber tire according to claim 1, wherein the at least one electrically conductive yarn is positioned
    on the outer surface of a carcass reinforcement ply between the carcass reinforcement plies and the sidewall rubber layer, or
    on the inner surface of a carcass reinforcement ply between the carcass reinforcement plies and the tire rubber inner liner layer, or
    between two carcass reinforcement plies.

3. The pneumatic rubber tire according to claim 1, wherein the organic fibers are thermoplastic polymer fibers selected from the group consisting of polyester fibers, polyamide fibers, and para-aramid fibers.

4. The pneumatic rubber tire according to claim 1, wherein the organic fibers are cotton fibers, rayon fibers, or thermoplastic polymer fibers.

5. The pneumatic rubber tire according to claim 1, wherein the second yarn is a cotton fiber yarn.

6. The pneumatic rubber tire according to claim 1, wherein the plurality of stainless steel fibers are twisted and/or cabled together to form the first yarn.

7. The pneumatic rubber tire according to claim 1, wherein the stainless steel fibers have an equivalent diameter less than 30 μm.

8. The pneumatic rubber tire according to claim 1, wherein the stainless steel fibers are made via bundled drawing.

9. The pneumatic rubber tire according to claim 1, wherein the stainless steel fibers are filaments.

10. The pneumatic rubber tire according to claim 1, wherein the stainless steel fibers are fibers of discrete length.

11. The pneumatic rubber tire according to claim 1,
wherein one or two second yarns is/are wrapped around the first yarn such that the first yarn is provided as a core yarn and such that the first yarn provides part of the surface of the electrically conductive yarn.

12. The pneumatic rubber tire according to claim 11, wherein the one or two second yarns is/are wrapped with less than 1000 turns per meter around the first yarn.

13. The pneumatic rubber tire according to claim 1,
wherein the electrically conductive yarn comprises two second yarns,
wherein one second yarn is wrapped in Z-direction around the first yarn, and
wherein another second cotton yarn is wrapped in S-direction around the first yarn.

14. The pneumatic rubber tire according to claim 1, wherein the first yarn provides at least 10% of the surface of the electrically conductive yarn.

* * * * *